(12) United States Patent  (10) Patent No.: US 8,031,318 B2
Aoki  (45) Date of Patent: Oct. 4, 2011

(54) LIQUID CRYSTAL DISPLAY DEVICE

(75) Inventor: Hironori Aoki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 307 days.

(21) Appl. No.: 12/402,992

(22) Filed: Mar. 12, 2009

(65) Prior Publication Data

US 2009/0174856 A1    Jul. 9, 2009

Related U.S. Application Data

(62) Division of application No. 11/420,154, filed on May 24, 2006, now Pat. No. 7,525,625.

(30) Foreign Application Priority Data

Aug. 8, 2005    (JP) .................................. 2005-229329

(51) Int. Cl.
*G02F 1/1339*    (2006.01)
*G02F 1/1345*    (2006.01)

(52) U.S. Cl. ........................................ 349/153; 349/149

(58) Field of Classification Search ........... 349/149–153
See application file for complete search history.

(56) References Cited

U.S. PATENT DOCUMENTS

| | | | |
|---|---|---|---|
| 5,680,192 A | 10/1997 | Burrell et al. | |
| 6,888,606 B2 * | 5/2005 | Hinata et al. | ................. 349/149 |
| 7,068,338 B2 | 6/2006 | Taguchi et al. | |
| 7,088,417 B2 | 8/2006 | Kamijima et al. | |
| 2006/0146212 A1 * | 7/2006 | Ahn et al. | ....................... 349/42 |
| 2007/0296674 A1 | 12/2007 | Aoki et al. | |

FOREIGN PATENT DOCUMENTS

| | | |
|---|---|---|
| JP | 6-202124 | 7/1994 |
| JP | 6-301045 | 10/1994 |
| JP | 11-149087 | 6/1999 |
| JP | 2002-55352 | 2/2002 |
| JP | 2003-161957 | 6/2003 |
| JP | 2003-186041 | 7/2003 |

OTHER PUBLICATIONS

Japanese Office Action issued Jan. 18, 2011, in Patent Application No. 2005-229329 (with partial English-language translation).

* cited by examiner

*Primary Examiner* — Mark Robinson
*Assistant Examiner* — Charles Chang
(74) *Attorney, Agent, or Firm* — Oblon, Spivak, McClelland, Maier & Neustadt, L.L.P.

(57) ABSTRACT

A liquid crystal display device according to an embodiment of the present invention includes: a wiring substrate; an opposing substrate opposite to the wiring substrate; a sealing member for bonding the wiring substrate to the opposing substrate; a liquid crystal filled in a space defined by the wiring substrate, the opposing substrate, and the sealing member; a plurality of scanning signal lines formed in a display area formed inside the sealing member; a plurality of a display signal lines formed in the display area and crossing the scanning signal lines with an insulating film interposed therebetween; and a common signal line formed outside the display area, the scanning signal lines, the scanning signal lines, and common signal line being formed on the wiring substrate, and the common signal line including at least two conductive layers with one of the conductive layers changing a pattern width below a pattern of the sealing member.

3 Claims, 7 Drawing Sheets

RELATED ART

LIQUID CRYSTAL DISPLAY DEVICE

CROSS REFERENCES TO RELATED APPLICATIONS

This application is a Divisional of U.S. Ser. No. 11/420,154, filed May 24, 2006, the entire content of which is incorporated herewith by reference, and claims priority under 35 U.S.C. 119 to Japanese Application JP 2005-229329 filed Aug. 8, 2005.

BACKGROUND OF THE INVENTION

Field of the Invention

In general, liquid crystal display devices are structured such that a pair of upper and lower electrode substrates having transparent electrodes are bonded to each other by use of a sealing member formed around an image display portion of the substrate and liquid crystal is filled therein. The liquid crystal display devices are classified into an active matrix type and a passive matrix type. An active matrix type liquid crystal display device as disclosed in Japanese Unexamined Patent Application Publication No. 11-149087 has a TFT array substrate where thin film transistors as switching elements are arranged in matrix (see Japanese Unexamined Patent Application Publication No. 11-149087). Then, the TFT array substrate is bonded to an opposing substrate through a sealing member. Liquid crystal is filled in between the TFT array substrate and the opposing substrate.

FIG. 13 is a plan view showing a corner portion of a peripheral portion of an image display portion of the TFT array substrate constituting the liquid crystal display device as disclosed in Japanese Unexamined Patent Application Publication No. 11-149087. In FIG. 13, reference numeral 1 denotes a wiring substrate having a TFT array; 2, a display area; 3, a scanning signal line; 5, a display signal line; 7, a common signal line; and 8, a sealing member.

In the liquid crystal display device, the sealing member 8 is formed around the display area 2. A pattern of the sealing member 8 has a portion overlapping with the scanning signal line 3 and a portion overlapping with the display signal line 5. Further, the sealing member 8 is arranged to overlap with the common signal line 7 at the corner of the display area 2. Assuming that the common signal line 7 is not provided, a base portion on which the sealing member 8 is to be formed becomes uneven: there is a step corresponding to the line height between a portion having the scanning signal line 3 or the display signal line 5 or the rest. Thus, a change in panel gap occurs due to the step at the corner of the image display portion, and causes an uneven display. However, in the technique as disclosed in Japanese Unexamined Patent Application Publication No. 11-149087, the common signal line 7 is formed near the corner of the wiring substrate 1 having the TFT array through the same process as that of either the scanning signal line 3 or the display signal line 5. As a result, a difference in level on the base portion underlying the sealing member 8 on the array substrate is eliminated or reduced. Therefore, the uneven display due to the change in panel gap can be controlled.

On the other hand, in the passive matrix type liquid crystal display device as disclosed in Japanese Unexamined Patent Application Publication No. 2003-186041, a transparent substrate having a segment electrode for applying voltage to liquid crystal is bonded to an opposing substrate having a common electrode through a sealing member. Liquid crystal is filled in between the substrate and the opposing substrate. A pixel is defined as a crossing point between the segment electrode and the common electrode.

FIG. 14 shows the structure of the liquid crystal display device as disclosed in FIG. 9 of Japanese Unexamined Patent Application Publication No. 2003-186041. FIG. 14 is a sectional view showing the structure of the liquid crystal display device. In FIG. 14, reference numeral 101 denotes a transparent substrate provided with a segment electrode (not shown) for applying a voltage to liquid crystal; 7a and 7b, a common signal line formed on the transparent substrate 101; 8, a sealing member formed on the transparent substrate; 19, a common electrode applied with a common signal; 102, a transparent substrate provided with the common electrode 19; 18, a conductive member; and 12, liquid crystal filled in a space defined by the above two substrates and the sealing member.

A driving circuit (not shown) or flexible substrate (not shown) formed on the transparent substrate 101 supplies a common signal to the common signal line 7. The common signal supplied to the common signal line 7 is applied to the common electrode 19 on the opposing substrate 102 through the conductive member 18. In this structure, the common signal line below the sealing member 8 has the two-layer structure, which enables a low line resistance. Further, the common signal line 7 is arranged to underlie the sealing member 8, so the sealing member 8 blocks infiltration of water from the outside of the panel to thereby improve a corrosion resistance of the common signal line 7.

however, the conventional liquid crystal display device has the following problems. That is, in the liquid crystal display device of FIG. 13, the common signal line 7 extends below the sealing member 8 pattern. Hence, it is necessary to minimize a difference in level on the base portion between a region where the sealing member 8 overlaps with the common signal line and a region where the sealing member 8 overlaps with the scanning signal line 3 or the display signal line 5. In this way, the abrupt change in panel gap that locally occurs can be suppressed. In general, it is rare that the scanning signal line and the display signal line largely differ in film thickness. Thus, in the liquid crystal display device as disclose in Japanese Unexamined Patent Application Publication No. 11-149087, the common signal line is formed using a material for the scanning signal line or a signal line to thereby level the base portion below the sealing member 8 pattern. That is, if the film thickness of the common signal line 7 increases, an abrupt change in panel gap locally occurs. Accordingly, with this structure, the common signal line should be formed using one of the scanning signal line and the material for a signal line. It is difficult to lower the resistance of the common signal line.

Further, there is a method of increasing a pattern width of the common signal line to lower the line resistance. However, if the line pattern width is increased, the width of a peripheral portion where the sealing member 8 is formed is increased. As a result, a frame area increases, resulting in a problem in that a compact liquid crystal display device with a small panel size cannot be realized.

In addition, in the liquid crystal display device of FIG. 14, the common signal line 7 underlying the sealing member 8 pattern has the two-layer structure, which realizes the low line resistance. However, if the common signal line of the two-layer structure is formed, there is a possibility that the height of the base portion largely changes at the border between a region where the display signal line or scanning signal line overlaps with the sealing member 8 and a region where the common signal line overlaps with the sealing member. In this case, the uneven display is caused due to the abrupt change in panel gap at the portion concerned. Accordingly, in the structure of FIG. 14, a region where the two-layer line can be formed is limited for avoiding the abrupt change in panel gap. In some cases, this hinders the reduction in resistance necessary for high-speed driving.

As mentioned above, in the conventional liquid crystal display device, the uneven display is caused due to the abrupt change in panel gap, so the resistance of common signal line cannot be lowered. That is, if the common signal line has the two-layer structure, the panel gap abruptly changes. This leads to a problem in that the uneven display is caused, and display quality cannot be improved.

As discussed above, a conventional display device faces a problem in that, if the resistance of the common signal line is lowered, the uneven display is caused due to the abrupt change in panel gap, and the display quality cannot be improved.

SUMMARY OF THE INVENTION

The present invention has been accomplished in view of the above problems, and it is accordingly an object of the invention to provide a liquid crystal display device that enables high display quality.

A liquid crystal display device according to a first aspect of the invention includes: a wiring substrate; an opposing substrate opposite to the wiring substrate; a sealing member for bonding the wiring substrate to the opposing substrate; a liquid crystal filled in a space defined by the wiring substrate, the opposing substrate, and the sealing member; a plurality of scanning signal lines formed in a display area formed inside the sealing member; a plurality of display signal lines formed in the display area and crossing the scanning signal lines through an insulating film; and a common signal line formed outside the display area, the scanning signal lines, the scanning signal lines, and common signal line being formed on the wiring substrate, and the common signal line including at least two conductive layers with one of the conductive layers changing a pattern width below a pattern of the sealing member. Thus, a resistance of the common signal line can be lowered with no abrupt change in panel gap, making it possible to improve display quality.

According to a second aspect of the invention, in the liquid crystal display device according to the first aspect, the common signal line below the pattern of the sealing member extends along one side of the sealing member, and the pattern width of the conductive layer is changed in a direction in which the common signal line extends. Thus, a delay of a common signal can be suppressed.

According to a third aspect of the invention, in the liquid crystal display device according to the second aspect, in the direction in which the common signal line extends, the pattern width of the conductive layer increases as a distance from an end portion on a signal supply side of the wiring substrate on which a signal is supplied to the display signal line or the scanning signal line. Thus, an effective pattern width of a common signal line can be increased, and a resistance can be lowered.

According to a fourth aspect of the invention, in the liquid crystal display device according to the second aspect, a plurality of lead-out lines for supplying a signal to the scanning signal line or the display signal line are provided outside the display area, and as the lead-out lines are connected with the scanning signal line or the display signal line, the pattern width of the common signal line is increased stepwise. Thus, an effective pattern width of a common signal line can be increased, and a resistance can be lowered.

According to a fifth aspect, in the liquid crystal display device according to second aspect of the invention, at one side of the sealing member where the common signal line extends, the common signal line is formed on the display area side inside the pattern of the sealing member. Thus, an effective pattern width of a common signal line can be increased, and a resistance can be lowered.

According to a sixth aspect, in the liquid crystal display device according to second aspect of the invention, among conductive layers of the common signal line, all the conductive layers but an uppermost conductive layer extend up to the outside of an outer edge of the pattern of the sealing member at one end of the sealing member in which the common signal line extends, and the conductive layers extending up to the outside of the outer edge of the pattern of the sealing member are covered with two or more insulating films. Thus, corrosion of a common signal line can be prevented.

According to a seventh aspect of the invention, in the liquid crystal display device according to the first aspect, a plurality of lead-out lines for supplying a signal to the scanning signal line or the display signal line are provided outside the display area, a plurality of common signal auxiliary lines made up of conductive layers different from the conductive layers for the lead-out lines are formed between the plurality of lead-out lines, and a plurality of common signal line connecting lines connected with the plurality of common signal auxiliary lines are formed. This enables further reduction in resistance.

A liquid crystal display device according to an eight aspect of the invention includes: a wiring substrate; an opposing substrate opposite to the wiring substrate; a sealing member for bonding the wiring substrate to the opposing substrate; a liquid crystal filled in a space defined by the wiring substrate, the opposing substrate, and the sealing member; a plurality of scanning signal lines formed in a display area formed inside the sealing member; a plurality of display signal lines formed in the display area and crossing the scanning signal lines through an insulating film; and a common signal line formed outside the display area and extending along one end of the sealing member below the pattern of the sealing member, the scanning signal lines, the scanning signal lines, and common signal line being formed on the wiring substrate, and the common signal line including at least two conductive layers, all the conductive layers but an uppermost conductive layer among the conductive layers of the common signal line extending up to the outside of an outer edge of the pattern of the sealing member at one end of the sealing member in which the common signal line extends, and the conductive layers extending up to the outside of the outer edge of the pattern of the sealing member being covered with two or more insulating films. Thus, a resistance of a common signal line can be lowered, making it possible to improve display quality.

According to a ninth aspect of the invention, in the liquid crystal display device according to the first aspect, the common signal line includes a conductive layer for forming the display signal line and a conductive layer for forming the scanning signal line. Thus, a resistance of a common signal line can be lowered, making it possible to improve display quality.

According to a tenth aspect of the invention, in the liquid crystal display device according to the eight aspect, the common signal line includes a conductive layer for forming the display signal line and a conductive layer for forming the scanning signal line. Thus, a resistance of a common signal line can be lowered, making it possible to improve display quality.

A liquid crystal display device according to an eleventh aspect of the invention includes: a wiring substrate; an opposing substrate opposite to the wiring substrate; a sealing member for bonding the wiring substrate to the opposing substrate; a liquid crystal filled in a space defined by the wiring substrate, the opposing substrate, and the sealing member; a plurality of scanning signal lines formed in a display area formed inside the sealing member; a plurality of display signal lines formed in the display area and crossing the scanning signal lines through an insulating film; a plurality of lead-out lines for supplying a signal to the display signal line or the scanning signal line, which are provided outside the display area; a common signal line formed outside the display area; a plurality of common signal auxiliary lines arranged between the adjacent lead-out lines and formed using a conductive layer different from the lead-out lines; and a common signal connecting line for bringing the plurality of common signal auxiliary lines into conduction. Thus, a resistance of a common signal line can be lowered, making it possible to improve display quality.

According to the present invention, it is possible to provide a liquid crystal display device that ensures high display quality.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

Figure 1:
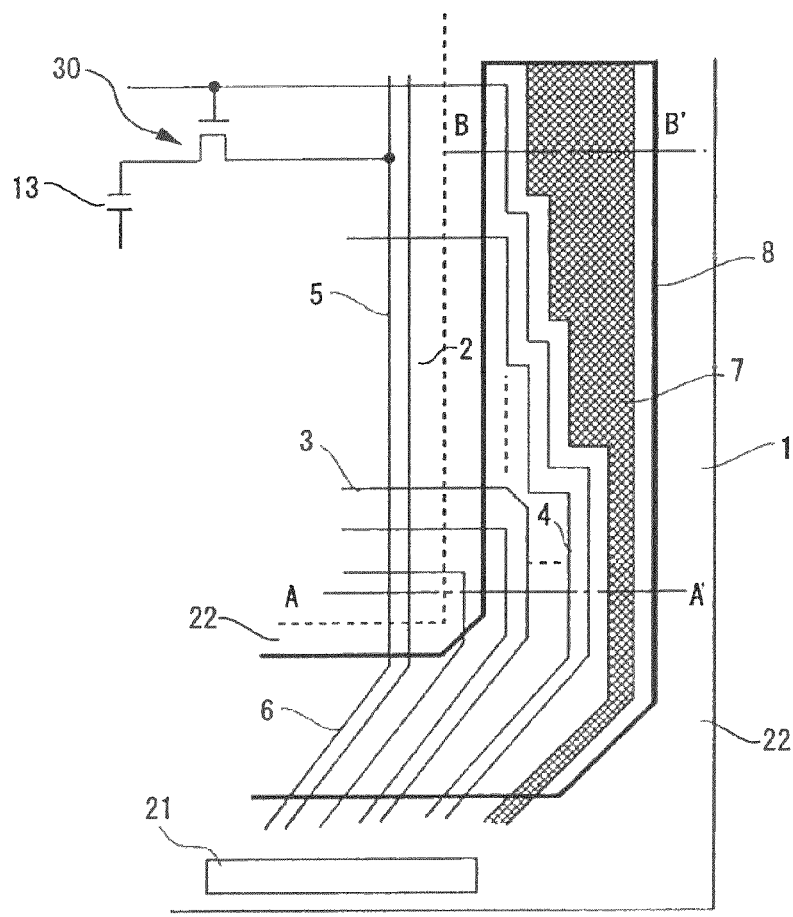
FIG. 1 is a plan view showing the structure of an end portion of a wiring substrate according to a first embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Hereinafter, embodiments of the present invention are described. The following description is given for illustrating the embodiments of the present invention, and the present invention is not limited to the following embodiments. For clear description, the following description is omitted and simplified as appropriate. Those skilled in the art could easily execute change, addition, and replacement of elements in the following embodiments within the scope of the present invention. Incidentally, the same components are denoted by like reference numerals throughout the accompanying drawings, and description thereof is omitted if not necessary.

First Embodiment

Figure 2:
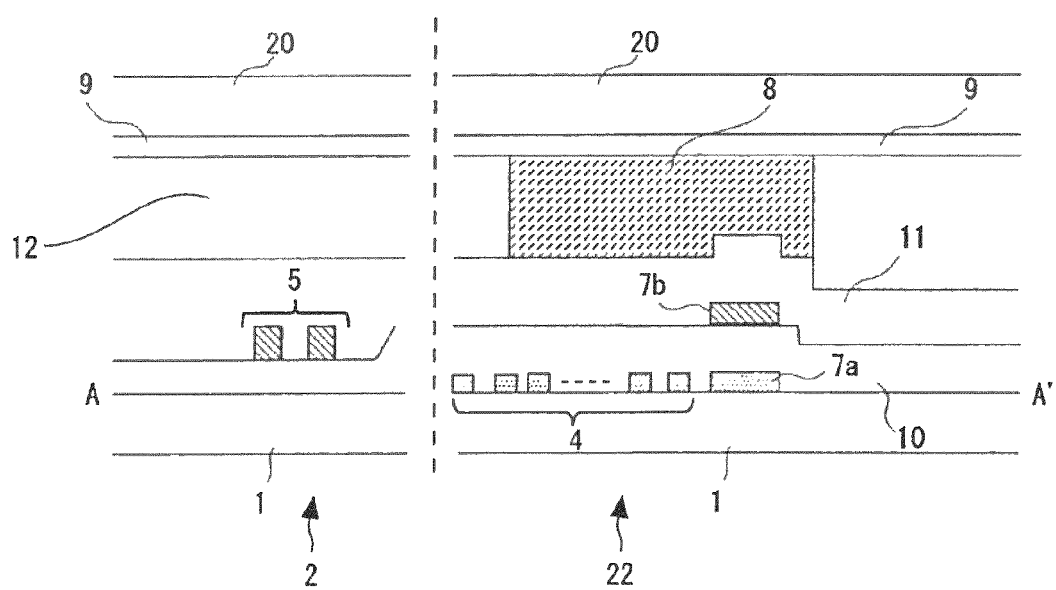
FIG. 2 is a side view showing the structure of a liquid crystal display panel taken along the line A-A' of FIG. 1.
Figure 3:
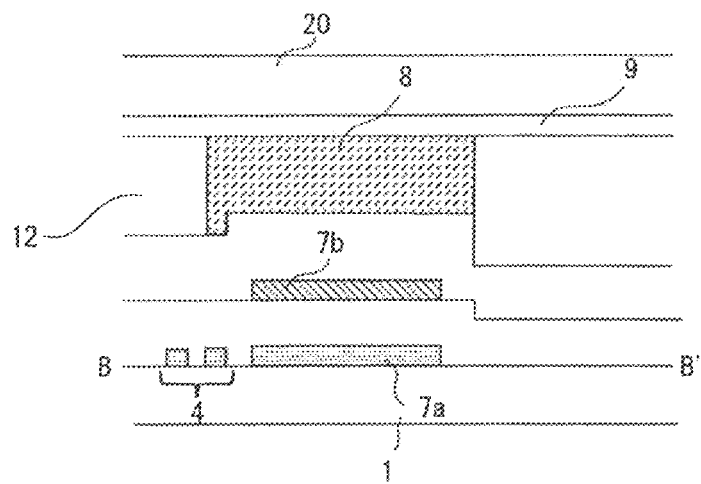
FIG. 3 is a side view showing the liquid crystal display panel taken along the line B-B' of FIG. 1.

Referring to FIGS. 1 to 3, a liquid crystal display device according to a first embodiment is described. FIG. 1 is a plan view showing the structure of an end portion of a wiring substrate used in the liquid crystal display device of this embodiment. Incidentally, FIG. 1 shows the structure of a lower-right corner portion of a sealing member formed on the wiring substrate. FIG. 2 is a sectional view showing the structure of a liquid crystal display panel taken along the line A-A' of FIG. 1. FIG. 3 is a sectional view showing the structure of the liquid crystal display panel taken along the line B-B' of FIG. 1. In FIGS. 1 to 3, reference numeral 1 denotes a wiring substrate; 2, a display area; 3, a scanning signal line; 4, a scanning signal lead-out line connected with the scanning signal line; 5, a display signal line; 6, a display signal lead-out line connected with the display signal line; 7, a common signal line; 8, a sealing member; 9, a counter electrode; 10, a gate insulating film; 11, an interlayer insulating film; 12, liquid crystal; 20, an opposing substrate; 21, a driving IC; and 22, a frame area.

This embodiment describes an active matrix type liquid crystal display device by way of example. That is, the wiring substrate 1 of the liquid crystal display device of this embodiment is a TFT (thin film transistor) array substrate. For example, on the rectangular wiring substrate 1, the plural scanning signal lines 3 are formed in parallel. In FIG. 1, the plural scanning signal lines 3 are arranged in a horizontal direction at regular pitches. The plural display signal lines 5 and the plural scanning signal lines 3 cross each other with the gate insulating film interposed therebetween. That is, the display signal lines 5 are arranged on the gate insulating film 10 that covers the scanning signal lines 3, and the display signal lines 5 are formed orthogonally to the scanning signal lines 3. In FIG. 1, the plural display signal lines 5 are arranged in a vertical direction at regular pitches. The wiring substrate 1 may be a transparent insulating substrate such as a glass substrate. The scanning signal line 3 and the display signal line 5 have substantially the same film thickness. The gate insulating film 10 may be, for example, a silicon oxide film or silicon nitride film.

Thin film transistors 30 as switching elements are formed at crossing points between the scanning signal lines 3 and the display signal lines 5. The TFT 30 includes a drain electrode and a source electrode formed using the same layer as that for the display signal line 5. The source electrode is connected with the drain electrode through a semiconductor layer. Through the TFT, the display signal line 5 is connected with a pixel electrode. Thus, a display voltage is applied from the display signal line 5 to the pixel electrode 13 by turning on the TFT 30. The interlayer insulating film 11 is formed between the pixel electrode and the display signal line 5. Then, the drain electrode of the TFT is connected with the pixel electrode through a contact hole formed in the interlayer insulating film 11. The pixel electrodes are arrayed. A portion provided with each pixel electrode is defined as a pixel. A region having plural pixels arrayed is defined as the display area 2. The display area 2 is formed into a rectangular shape. The frame area 22 surrounds the display area 2. That is, an inner portion (upper-left side) across the dotted line of FIG. 1 is the display area 2, and an outer portion (lower-right side) across the dotted line is the frame area 22. Incidentally, the interlayer insulating film 11 may be formed using, for example, a silicon oxide film or silicon nitride film, or an organic insulating film.

The frame area 22 surrounds the display area 2. That is, the frame area 22 is formed in substantially hollow square shape. In the frame area 22 of the wiring substrate 1, the driving IC 21 is implemented. The driving IC 21 is provided near the lower end of the wiring substrate 1. The driving IC 21 serves as both a scanning signal driver IC and a display signal driver IC. That is, the driving IC 21 outputs a scanning signal and a display signal. Accordingly, the driving IC 21 is connected with the scanning signal lead-out line 4 connected with the scanning signal line and the display signal lead-out line 6 connected with the display signal line 5.

Formed in the frame area 22 are the plural display signal lead-out lines 6. The plural display signal lead-out lines 6 are arranged at predetermined intervals not to be electrically continuous to an adjacent line. The display signal lead-out line 6 extends from the driving IC 21 to the lower end of the display area 2. The display signal lead-out line 6 is connected with the display signal line 5 at the lower end of the display area 2. A display signal sent from the driving IC 21 is input to the display signal line 5 through the display signal lead-out line 6. The display signal lead-out line 6 and the display signal line 5 are formed using the same conductive layer. That is, the display signal lead-out line 6 and the display signal line 5 are integrally patterned. Incidentally, lines near the driving IC 21 are omitted from FIG. 1.

The scanning signal lead-out line 4 is arranged outside the lower-right corner of the display area 2 to extend from the driving IC 21 to the lower end of the display area 2. Then, the plural scanning signal lines 3 and the plural scanning signal lead-out lines 4 provided in the display area 2 are connected with each other. That is, a scanning signal from the driving IC 21 is input to the scanning signal line 3 through the scanning signal lead-out line 4. The plural scanning signal lead-out lines 4 are provided at predetermined intervals not to be electrically continuous to an adjacent line. The scanning signal line 3 and the scanning signal lead-out line 4 are formed using, for example, the same conductive layer. That is, the scanning signal lead-out line 4 and the scanning signal line 3 are integrally patterned. The plural scanning signal lead-out lines 4 provided in the frame area 22 are connected with the scanning signal lines 3 in the order from the lower end of the display area 2. In other words, the scanning signal line 3 closest to the lower end of the display area 2 is connected with the scanning signal lead-out line 4 closest to the display area, that is, the leftmost scanning signal lead-out line 4 at the line A-A'. The number of scanning signal lead-out lines 4 is smaller at an upper portion of the frame area 22. Accordingly, a proportion of the scanning signal lead-out lines 4 in the frame area 22 is smaller at an upper portion of the wiring substrate 1. Hence, in the frame area 22 on the right side of the wiring substrate 1, a region having no scanning signal lead-out line 4 becomes wider at an upper portion.

The common signal line 7 is provided outside the scanning signal lead-out line 4. The common signal line 7 is formed in the frame area 22. In other words, the scanning signal lead-out line 4 extends between the common signal line 7 and the display area 2. As shown in FIGS. 2 and 3, the common signal line 7 has two layers: a common signal line 7a and a common signal line 7b. The common signal line 7a is formed using the conductive layer for the scanning signal lead-out line 4, and the common signal line 7b is formed using the conductive layer for the display signal lead-out line 6. Accordingly, the common signal line 7a is formed using a material for the scanning signal line 3 and the scanning signal lead-out line 4 with the same film thickness as those of the scanning signal line 3 and the scanning signal lead-out line 4. Further, the common signal line 7b is formed using a material for the display signal line 5 and the display signal lead-out line 6 with the same film thickness as those of the display signal line and the display signal lead-out line 6. The common signal line 7 receives a common signal from the driving IC 21.

Further, the gate insulating film 10 is formed between the common signal line 7a and the common signal line 7b. That is, the common signal line 7b is formed above the gate insulating film 10 that covers the common signal line 7a. A contact hole (not shown) is formed in the gate insulating film 10 for connecting the common signal line 7a and the common signal line 7b at the end of the wiring substrate 1. Through the contact hole, the common signal line 7a and the common signal line 7b are connected. The contact hole is formed on the signal input side, that is, near the driving IC 21. In this way, the common signal line 7 has a two-layer structure having the common signal line 7a and the common signal line 7b, and the common signal line 7a and the common signal line 7b are separated by the gate insulating film 10. Thus, a resistance of the common signal line 7 can be lowered. Preferably, the common signal line 7a and the scanning signal line are formed using the same conductive layer, and the common signal line 7b and the display signal line 5 are formed using the same conductive layer. Thus, the total thickness of the common signal line 7 can be increased, and a wiring resistance of the common signal line 7 can be lowered. In addition, the interlayer insulating film 11 is formed above the common signal line 7b.

The common signal line 7 is formed to change its pattern width. To be specific, as shown in FIG. 1, the common signal line 7 is formed to increase a pattern width as the distance from the driving IC 21 increases. Accordingly, as shown in FIGS. 2 and 3, the pattern width of the common signal line 7 is different between the section taken along the line A-A' of FIG. 1 and the section taken along the line B-B' of FIG. 1. That is, in the frame area 22 on the right side of the wiring substrate 1, a region having no scanning signal lead-out line 4 becomes wider at the upper end. Thus, at the upper end of the wiring substrate 1, the pattern width of the common signal line 7 can become wider. That is, at the upper end of the wiring substrate 1, the pattern width of the common signal line 7 can be increased without bringing the common signal line 7 and the scanning signal lead-out line 4 into contact with each other. In the frame area 22, the pattern width of the common signal line 7 is narrower near the end portion on the side where the driving IC 21 is provided and is wider near the end portion on the opposite side to the side where the driving IC 21 is provided. As mentioned above, the pattern width of the common signal line 7 becomes wider as the distance from the end portion on the signal supplying side of the wiring substrate 1 increases.

In this embodiment, each time the scanning signal lead-out line 4 is connected with the scanning signal line 3, the pattern width of the common signal line 7 is increased stepwise. That is, when the scanning signal line 3 is connected with the scanning signal lead-out line 4, a proportion of the scanning signal lead-out line 4 in the frame area 22 becomes small. Accordingly, the pattern width of the common signal line 7 can be increased by an amount corresponding to the line pitch of the scanning signal lead-out line 4. In this way, a resistance of the common signal line 7 can be further lowered by changing the pattern width of the common signal line 7. Thus, a delay of the common signal can be minimized, and the display quality can be improved. Accordingly, high-speed driving is enabled without deteriorating the display quality. According to the present invention, in addition to a beneficial effect of the two-layer structure of the common signal line 7, an effect of the wider pattern width of the common signal line 7 can be produced, and a resistance of the common signal line 7 can be further lowered.

The sealing member 8 for bonding the wiring substrate 1 to the opposing substrate 20 is applied to the frame area 22. In general, after the sealing member 8 is applied onto the frame area 22 of the opposing substrate 20, the opposing substrate 20 and the wiring substrate 1 are bonded. The sealing member 8 is provided on the interlayer insulating film 11. Thus, the sealing member 8 formed in the frame area 22 is positioned above the common signal line 7. That is, as shown in FIG. 2, the sealing member 8 is formed above the common signal line 7 through the interlayer insulating film 11. The sealing member 8 is formed like a frame so as to surround the display area 2. The common signal line 7 and the scanning signal lead-out line 4 are partially arranged below the sealing member 8 pattern. In this example, the common signal line 7 overlaps with the right side portion of the frame-like sealing member 8. Further, the common signal line 7 extends along the right side portion of the frame-like sealing member 8. Accordingly, the common signal line 7 below the sealing member 8 pattern is formed to extend in the extending direction of the right side portion of the frame-like sealing member 8. That is, the common signal line 7 extends in the vertical direction of FIG. 1. Accordingly, at a lower-right corner portion and the right side portion of the frame-like sealing member 8, the sealing member 8 overlaps with the common signal line 7.

Here, the common signal line 7 has a laminate structure including the common signal line 7a and the common signal line 7b. Therefore, the base portion having the common signal line 7 has a larger height than that of the base portion having the scanning signal lead-out line 4. That is, in a region having the common signal line 7, two conductive layers and two insulating layers are formed, and in a region having the scanning signal lead-out line 4, one conductive layer and two insulating layers are formed. Accordingly, the height of the base portion below the sealing member 8 pattern is increased by the film thickness of the common signal line 7b in the region having the common signal line 7.

In the region having the sealing member 8 pattern, an area of the scanning signal lead-out line 4 and an area of the common signal line 7 are changed stepwise. More specifically, at the lower end of the frame area 22, the region of the scanning signal lead-out line 4 becomes wider, and the region of the common signal line 7 becomes narrower. On the other hand, at the upper end of the frame area 22, the region of the scanning signal lead-out line 4 becomes narrower, and the region of the common signal line 7 becomes wider. Here, the width of the region of the scanning signal lead-out line 4 in the region having the sealing member 8 pattern implies the distance between the scanning signal lead-out line 4 closest to the display area and the outermost scanning signal lead-out line 4 in the region having the sealing member 8 pattern. The sum of the width of the region of the scanning signal lead-out line 4 and the width of the region of the common signal line 7 can be substantially constant. The base portion below the sealing member 8 pattern gradually changes its height. That is, the base portion height is larger by the common signal line 7b in the region of the common signal line 7 than in the region of the scanning signal lead-out line 4. In this embodiment, as the width of the scanning signal lead-out line 4 is decreased, the width of the region of the common signal line 7 is increased stepwise. Thus, as the distance from the driving IC 21 increases, an area of the base portion having the larger height gradually increases. Almost all the scanning signal lead-out lines 4 are connected with the scanning signal lines 3 at the end portion on the opposite side to the side where the driving IC 21 is provided, so almost all of the base portion below the sealing member 8 pattern has the larger height.

With the above pattern shape, the base portion just below the sealing member 8 can gradually change its height. That is, the pattern width of the common signal line 7 gradually changes below the sealing member 8 pattern such that the boundary line between the region of the common signal line 7 and the region of the scanning signal lead-out line 4 gradually approaches the display area 2 as the distance from the driving IC 21 increases. Further, the boundary line between a region having one conductive layer and a region having two conductive layers can be made longer. Thus, it is possible to suppress a luminance change accompanying the change in gap thickness of the portion below the sealing member 8 down to a practically invisible level.

Further, almost all region of the common signal line 7 is formed below the sealing member 8 pattern, making it possible to suppress the infiltration of water from the outside of the panel. That is, the pattern width of the common signal line 7 is defined such that the common signal line 7 is formed closer to the display area, inside the outer edge of the sealing member 8. As a result, the common signal line 7 is arranged inside the outer edge of the sealing member 8 pattern. This enables an anti-corrosion liquid crystal display device. Thus, the degradation of display quality in the liquid crystal display device can be avoided, and the display quality of the liquid crystal display device can be improved. Further, with the above structure, an increase in the frame area 22 area is prevented, so a frame of the liquid crystal display device can be made narrow.

Further, the common signal line 7a and the common signal line 7b are connected, for example, near the corner portion of the wiring substrate 1. That is, a contact hole is formed in the gate insulating film 10 for connecting the common signal line 7a and the common signal line 7b near the corner portion of the wiring substrate 1. Furthermore, the interlayer insulating film 11 is partially removed to expose the common signal line 7b. For example, a transfer electrode is formed in the region where the common signal line 7b is exposed. This transfer electrode makes the common signal line 7 electrically continuous to the counter electrode 9 on the opposing substrate 20. The transfer electrode can be formed anywhere but the portion below the sealing member 8 pattern. The common signal line 7 may extend up to the end portion opposite to the end portion where the driving IC 21 is provided, and the transfer electrode may be formed there.

The opposing substrate 20 is a transparent insulating substrate such as a glass substrate. In a color liquid crystal display device, not-shown color filters or black matrix (BM) are formed in matrix on the opposing substrate 20. On the color filter or BM, the counter electrode 9 opposing the pixel electrode is formed on substantially the entire surface of the opposing substrate 20. The counter electrode 9 is connected with the above transfer electrode.

The liquid crystal 12 is sandwiched between the opposing substrate 20 and the wiring substrate 1. That is, the liquid crystal 12 is filled in a space defined between the wiring substrate 1 and the opposing substrate 20 and the sealing member 8. In this way, the liquid crystal display panel is completed. Further, a spacer (not shown) for keeping an interval between the wiring substrate 1 and the opposing substrate 20 uniform may be provided. A backlight unit is disposed on the rear side of the liquid crystal display panel. The backlight unit is a surface light source for uniformly emitting light throughout the surface. The backlight unit includes a light source such as an LED or a fluorescent tube, a light guide plate for guiding the light from the light source to the entire surface, and an optical sheet such as a light diffusion sheet or a prism sheet. Further, an external control circuit is connected with the wiring substrate 1 through, for example, a flexible wiring substrate. Based on a power supply voltage, control signals, and image data from the external control circuit, the driving IC 21 sends a display signal, a scanning signal, and a common signal. Then, liquid crystal is driven by applying a voltage between the counter electrode 9 and pixel electrode. As a result, an amount of light transmitted through the liquid crystal display panel is controlled. Incidentally, an orientation film may be provided to the wiring substrate 1 and the opposing substrate 20. Further, a polarization film may be bonded to the liquid crystal display panel.

Incidentally, the above description is directed to an example where the pattern width of the common signal line 7 is changed stepwise, but the present invention is not limited thereto. For example, the pattern width of the common signal line 7 may be changed at predetermined angle. That is, the common signal lines 7 may be diagonally patterned. Further, in the above description, the common signal line 7 is adjacent to the scanning signal lead-out line 4, but the present invention is not limited thereto. For example, the common signal line 7 may be arranged adjacent to the display signal lead-out line 6. In this case, the pattern width of the display signal lead-out line 6 is changed in accordance with the connection between the display signal lead-out line 6 and the display signal line 5. As described above, the arrangement of the common signal lines 7 may be appropriately changed in accordance with the position of the driving IC 21 or the arrangement of the lead-out lines. That is, in the direction in which the common signal line 7 extends, the pattern width of the common signal line 7a increases as a distance from the end portion on a signal supply side of the wiring substrate. The display signal or the scanning signal input from the signal supply side of the wiring substrate. In addition, the common signal line 7 may be made up of three or more conductive layers in accordance with the pattern structure of the wiring substrate 1.

In the above description, the driving IC 21 is connected onto the wiring substrate 1, but the present invention is not limited thereto. For example, the driving IC may be provided outside the wiring substrate 1, and a flexible wiring substrate (FPC) may be connected with the wiring substrate 1. In this case, the driving IC 21 provided outside the wiring substrate 1 supplies signals through the FPC. This structure also produces the same beneficial effects as the above effects.

Second Embodiment

Figure 4:
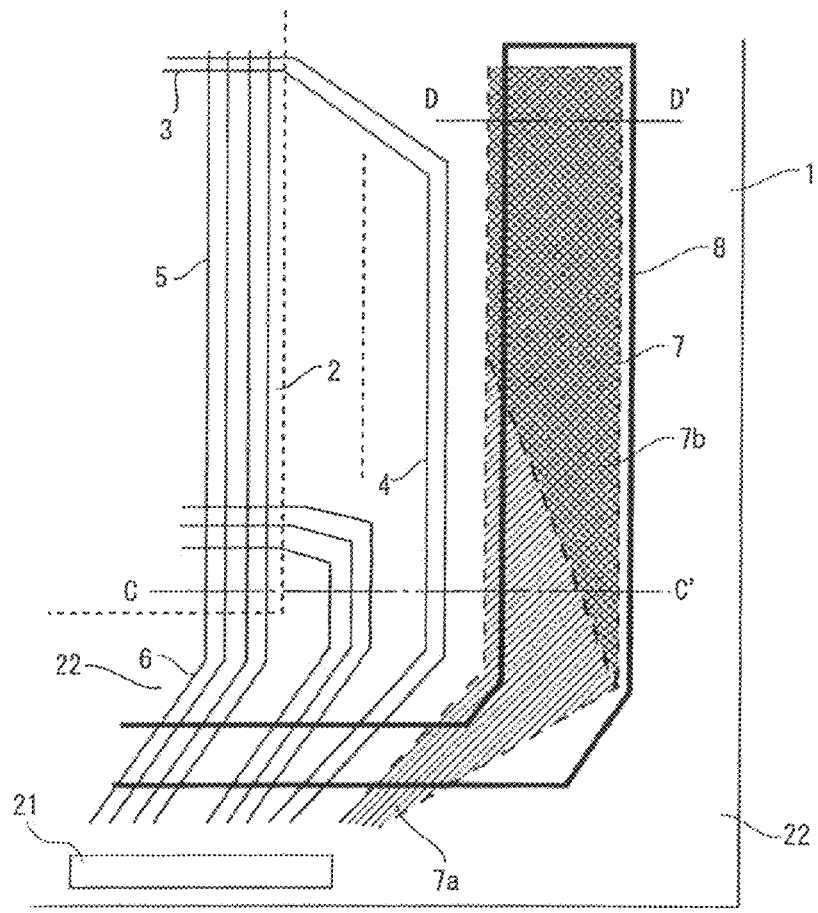
FIG. 4 is a plan view showing the structure of an end portion of a wiring substrate according to a second embodiment of the present invention.
Figure 5:
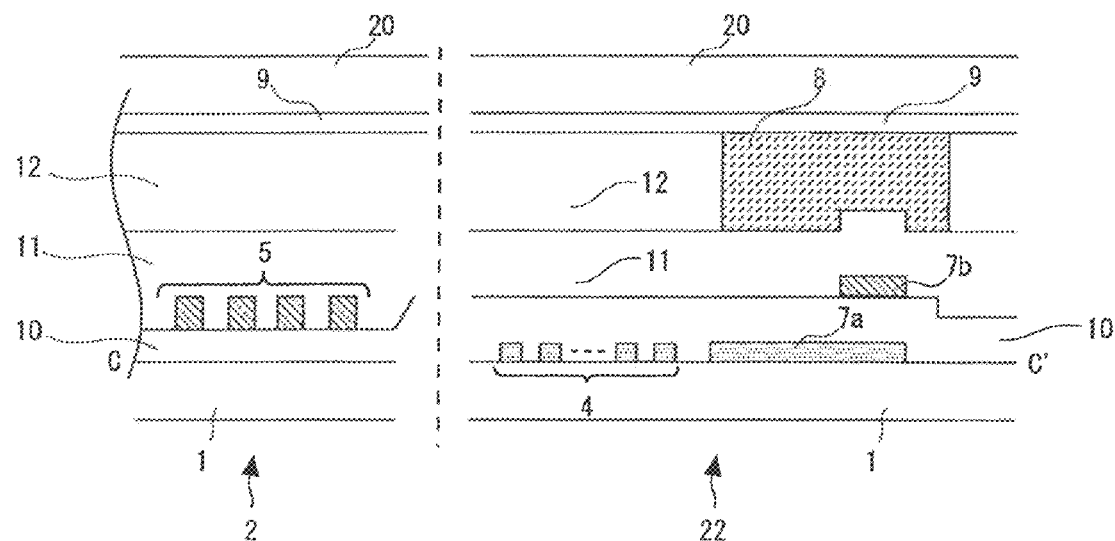
FIG. 5 is a side view showing the structure of a liquid crystal display panel taken along the line C-C' of FIG. 4.
Figure 6:
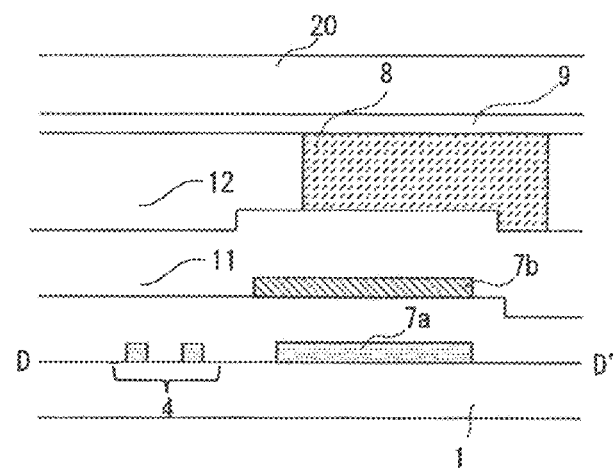
FIG. 6 is a side view showing the structure of a liquid crystal display panel taken along the line D-D' of FIG. 4.

Referring to FIGS. 4 to 6, the structure of a liquid crystal display device according to a second embodiment of the present invention is described. FIG. 4 is a plan view showing the structure of an end portion of a wiring substrate used in the liquid crystal display device of this embodiment. Incidentally, FIG. 4 shows the structure of the lower-right corner portion of the sealing member in the wiring substrate. FIG. 5 is a sectional view showing the structure of the liquid crystal display panel taken along the line C-C' of FIG. 4. FIG. 6 is a sectional view showing the structure of the liquid crystal display panel taken along the line D-D' of FIG. 4. The basic structure of the wiring substrate of this embodiment is the same as the first embodiment, so detailed description thereof is omitted. Further, description about the same components as those of the first embodiment is omitted.

In this embodiment, the scanning signal lead-out line 4 is formed inside the pattern of the sealing member 8. In addition, the common signal line 7 is provided outside the plural scanning lead-out lines 4. Further, only the pattern width of the common signal line 7b of the common signal line 7 having the two-layer structure is changed below the right side portion of frame-like sealing member. That is, the pattern width of the common signal line 7a of the common signal line 7 having the two-layer structure is substantially uniform below the sealing member 8 of the frame area 22 at the right end. More specifically, as shown in FIG. 5, the pattern width of the common signal line 7b is much smaller than that of the common signal line 7a near the driving IC 21. The pattern width of the common signal line 7b increases as the distance from the driving IC 21 increases. Then, as the distance from the driving IC 21 is further increased, the pattern width of the common signal line 7b is set to a predetermined width. Here, as shown in FIG. 6, the pattern width of the common signal line 7b is larger than that of the common signal line 7a. That is, the pattern width of the common signal line 7b of the common signal line 7 extending along the right side portion of the frame-like sealing member 8 gradually increases as the distance from the driving IC increases.

As shown in FIG. 4, the common signal lines 7b are diagonally patterned at the lower-right corner portion of the sealing member 8. Accordingly, as shown in FIG. 5, the pattern width of the common signal line 7b is smaller than that of the common signal line 7a in the section taken along the line C-C' near the driving IC 21. Then, in the section taken along the line D-D' apart from the driving IC 21, as shown in FIG. 6, the pattern width of the common signal line 7b is larger. Thus, an effective line width of the common signal line 7 can be increased, and a line resistance can be lowered. Incidentally, if the pattern width of the common signal line 7b is increased to extend up to the inside of the pattern of the sealing member 8, the pattern width is set constant even if the distance from the driving IC 21 increases. Here, the common signal line 7a and the common signal line 7b are connected through the contact hole provided on the driving IC 21 side. The contact hole can be formed near the line C-C'. At this time, if the contact hole is small enough, an influence of the panel gap is suppressed down to an invisible level. Alternatively, the common signal line 7b partially extends to a portion near the driving IC 21, and the contact hole may be formed outside the sealing member 8. In this case, the common signal line 7b extends to the outside of the sealing member 8 on the driving IC 21 side. That is, the pattern of the common signal line 7b is formed above a part of the pattern of the common signal line 7a. The pattern of the common signal line 7b preferably extends on the opposite side to the side adjacent to the scanning signal lead-out line 4. That is, the pattern of the common signal line 7b preferably extends along the outer edge of the sealing member 8.

Further, the common signal line 7 formed near the scanning signal lead-out line 4 below the sealing member 8 is made up of one conductive layer. That is, the common signal line 7b is not formed in the vicinity of the scanning signal lead-out line 4. In the region having the scanning signal lead-out line 4, one conductive layer and two insulating films are formed. The common signal line 7 near the scanning signal lead-out line 4 below the sealing member 8 includes one conductive layer and two insulating films. Accordingly, in a region having the sealing member 8 pattern, the region of the common signal line 7 and the region of the scanning signal lead-out line 4 have one conductive layer at the vicinity of the boundary therebetween. Thus, the abrupt change in height of the base portion is controlled. Hence, it is possible to prevent the uneven display caused at the boundary between the region of the common signal line 7 and the region of the scanning signal lead-out line 4.

Further, in this embodiment, the common signal lines 7b are diagonally patterned. Thus, in the direction in which the common signal line 7 extends, the boundary line between the region having one conductive layer and the region having two conductive layers is gradually approaching the display area. That is, in the region where the sealing member 8 overlaps with the common signal line 7, a ratio in width between the region including two or more conductive layers and the region including only one conductive layer is made to successively increase. As a result, in the region having the common signal line 7, the abrupt change in height of the sealing member 8 is suppressed. In this way, the uneven display due to the change in height of the base portion below the sealing member 8 can be controlled. Further, most of the common signal line 7 underlies the pattern of the sealing member 8 to thereby suppress the infiltration of water or the like from the outside of the panel. That is, the pattern width of the common signal line 7 is determined such that the common signal line 7 is provided inside the outer edge of the sealing member 8. Thus, the anti-corrosion display device can be provided, and the reduction in display quality of the liquid crystal display device can be prevented. Accordingly, the display quality of the liquid crystal display device can be improved.

In this embodiment, a beneficial effect can be obtained due to the multi-layer structure of the common signal line 7, and a resistance can be lowered. The above example describes the case where the common signal line 7 has the two-layer structure, but the common signal line 7 may have the multi-layer structure of three or more layers. In addition, in the portion where the sealing member 8 overlaps with the common signal line 7, the height of the base portion below the sealing member 8 can be gradually changed. Thus, the luminance change accompanying the change in gap below the sealing member 8 can be suppressed down to a practically negligible level. Further, most of the common signal line 7 underlies the sealing member to thereby suppress the infiltration of water or the like from the outside of the panel and provide the anti-corrosion liquid crystal display device. With the above structure, it is possible to keep the frame area 22 small and downsize the liquid crystal display device.

In the illustrated example of FIG. 4, the common signal lines 7b are diagonally patterned, but the present invention is not limited thereto. For example, similar to the first embodiment, the pattern width of the common signal line 7b may be changed stepwise. Further, in the above example, the common signal line 7 is adjacent to the scanning signal lead-out line 4 below the sealing member 8, but similar beneficial effects can be attained with the structure where the common signal line 7 is adjacent to the display signal lead-out line 6. In this case, the pattern width of the common signal line 7a made up of a conductive layer used for the scanning lead-out line 4 may be changed.

Preferably, the common signal line 7a and the scanning signal line are formed using the same conductive layer, and the common signal line 7b and the display signal line 5 are formed using the same conductive layer. The scanning signal line 3 and the display signal line 5 are patterned in different photolithographic steps, so the common signal line 7a and the common signal line 7b may have different patterns. Thus, a resistance of the common signal line can be lowered due to an increase in line width and line thickness. Further, a drop in productivity due to the increase in the number of manufacturing processes can be avoided.

Third Embodiment

Figure 7:
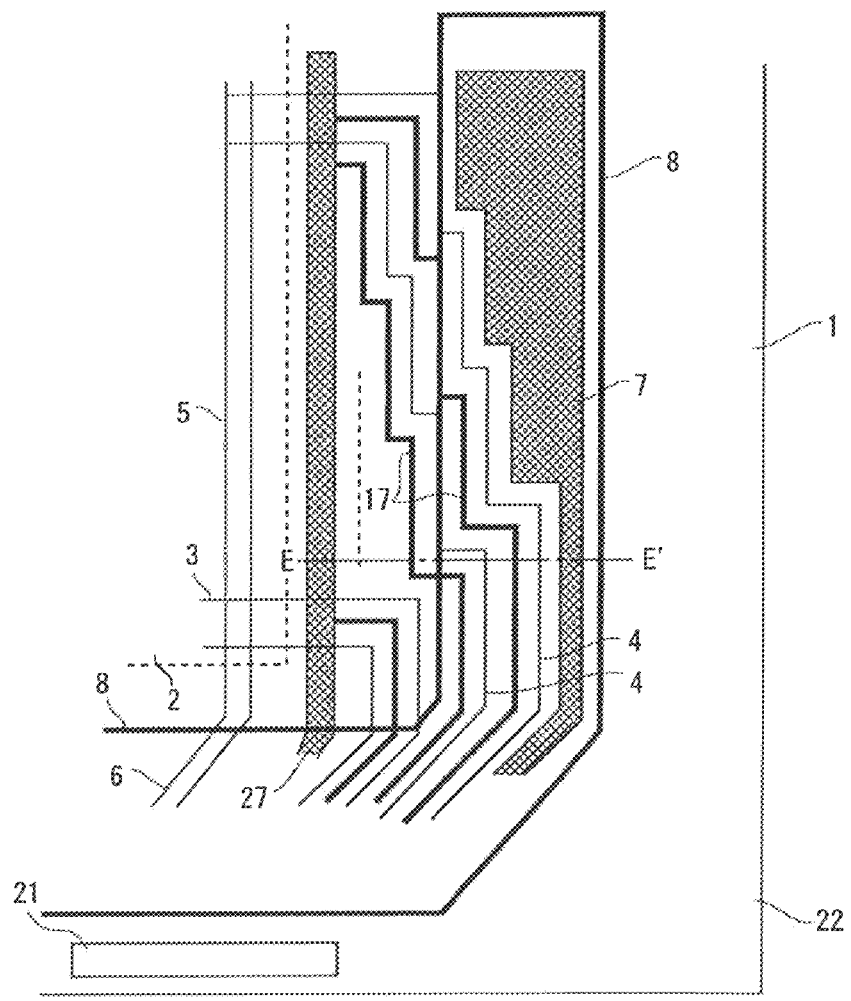
FIG. 7 is a plan view showing the structure of an end portion of a wiring substrate according to a third embodiment of the present invention.
Figure 8:
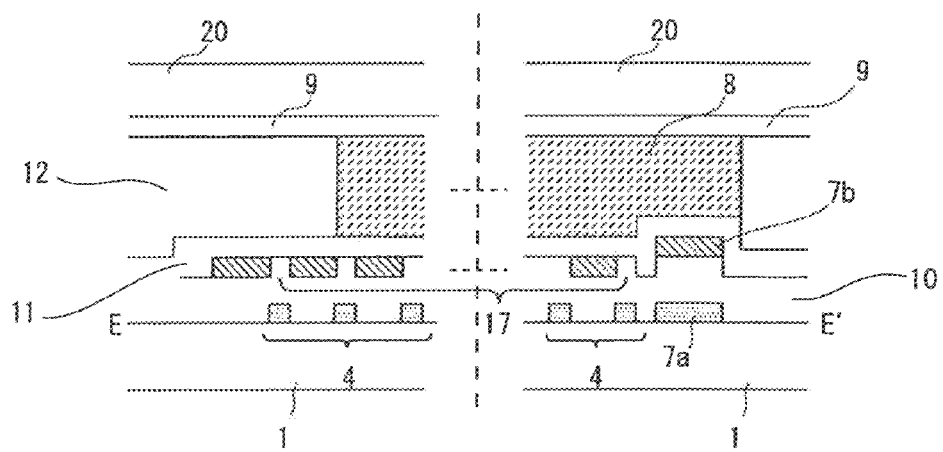
FIG. 8 is a side view showing the structure of a liquid crystal display panel taken along the line E-E' of FIG. 7.

Referring to FIGS. 7 and 8, the structure of a liquid crystal display device according to a third embodiment of the present invention is described. FIG. 7 is a plan view showing the structure of an end portion of a wiring substrate used in the liquid crystal display device of this embodiment. Incidentally, in FIG. 7, the structure of the lower-right corner portion of the sealing member in the wiring substrate is demonstrated. FIG. 8 is a sectional view showing the structure of the liquid crystal display panel taken along the line E-E' of FIG. 7. Incidentally, the basic structure of the wiring substrate of this embodiment is the same as that of the first embodiment, so detailed description thereof is omitted. Furthermore, description about the same components as those of the first embodiment is omitted.

In this embodiment, the pattern shape of the common signal line 7 provided outside the scanning signal lead-out line 4 is the same as that of the first embodiment. Further, in this embodiment, a common signal auxiliary line 17 extends between adjacent scanning signal lead-out lines. The common signal auxiliary line 17 is formed in a position corresponding to a gap between the adjacent the scanning signal lead-out lines 4. The line patterns of the common signal auxiliary lines 17 and the line patterns of the scanning signal lead-out lines 4 are alternately arranged.

The common signal auxiliary line 17 and the display signal line 5 are formed using the same conductive layer. That is, common signal auxiliary line 17 and the common signal line 7b are formed with the same material and thickness. As shown in FIG. 8, the scanning signal lead-out line 4 is not formed below the common signal auxiliary line 17. Thus, the height of the base portion below the sealing member 8 is based on one conductive layer and two insulating layers inside the common signal line 7. That is, the base portion height is the sum of the film thicknesses of the interlayer insulating film 11 and the gate insulating film 10 and the film thickness of the display signal line 5 or the scanning signal line 3. In general, the thickness of scanning signal line 3 is not largely different from that of the display signal line 5. Accordingly, in the region having the scanning signal lead-out line 4, the height of the base portion below the sealing member 8 pattern can be made substantially uniform.

The plural common signal auxiliary lines 17 are connected with common signal connecting lines 27 provided below the sealing member 8. The common signal connecting lines 27 and the common signal auxiliary line 17 can be formed using the same conductive layer. The common signal auxiliary line 17 and the common signal connecting lines 27 are connected with the driving IC 21, and supplied with common signals.

In this way, the common signal auxiliary line 17 is formed between the scanning signal lead-out lines 4, whereby the number of signal paths can be increased, and an effective line width of the common signal line 7 can be increased. Thus, a line resistance can be lowered, and the display quality can be improved.

If the common signal auxiliary line 17 and the scanning signal lead-out line 4 are formed using different conductive layers, the lines are prevented from short-circuiting even in the case of setting a relatively large pattern pitch in the same layer. That is, a line resistance can be further reduced without short-circuiting the lines.

In the above example, the common signal auxiliary line 17 extends between the scanning signal lead-out lines 4, but the present invention is not limited thereto. For example, the common signal auxiliary line 17 may be formed between the display signal lead-out lines 6. In this case, the common signal auxiliary line 17, and the scanning signal line 3 and the scanning signal lead-out line 4 are formed using the same conductive layer. Further, instead of adding the common signal auxiliary line 17 to the structure of the first embodiment, the common signal auxiliary line 17 may be used solely. That is, in the structure where the pattern width of the common signal line 7 is set substantially uniform, the common signal auxiliary line 17 and the common signal connecting lines 27 may be provided. Further, the common signal auxiliary line 17 may be uses to the embodiment 2. That is, this embodiment may be applied to the embodiment 2.

Fourth Embodiment

Figure 9:
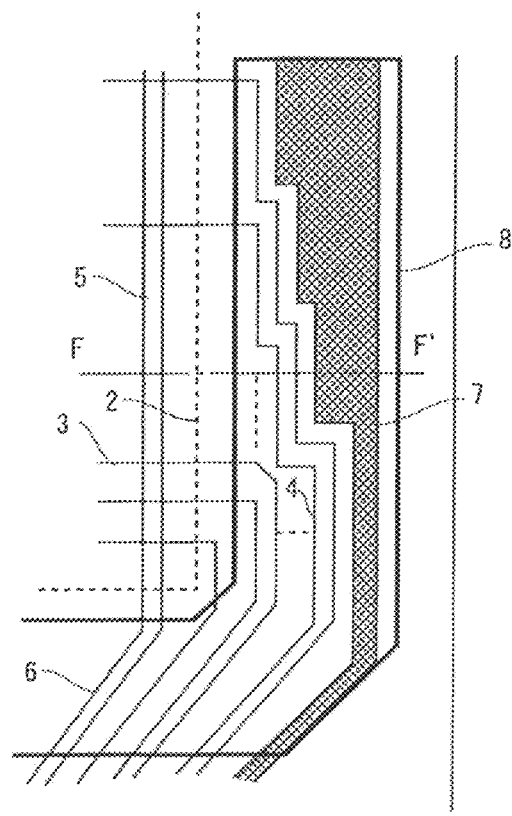
FIG. 9 is a plan view showing the structure of an end portion of the wiring substrate according to the fourth embodiment of the present invention.
Figure 10:
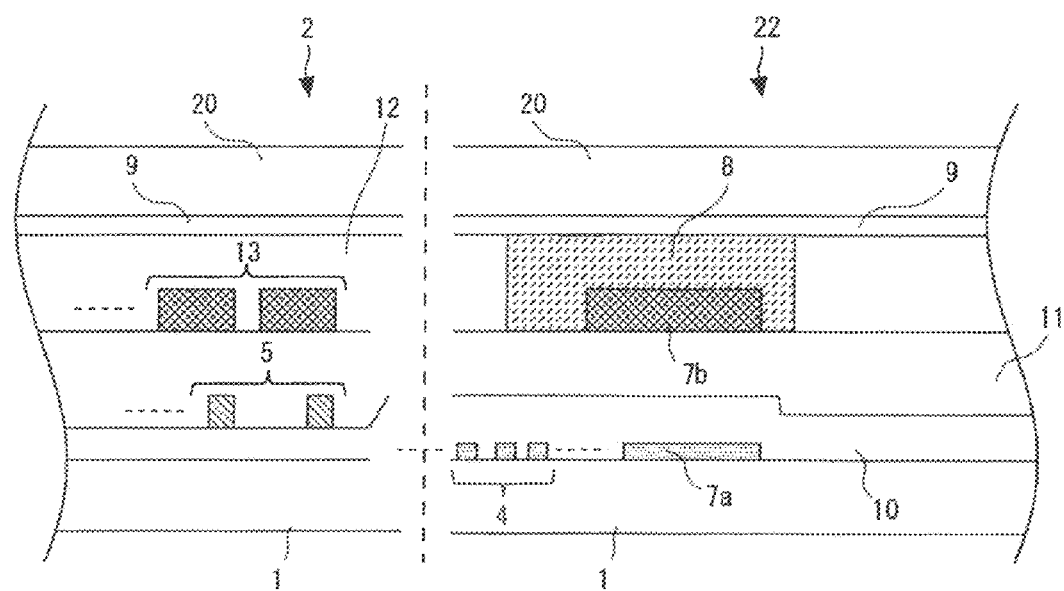
FIG. 10 is a side view showing the structure of a liquid crystal display panel taken along the line F-F' of FIG. 9.

Referring to FIGS. 9 and 10, the structure of a liquid crystal display device according to a fourth embodiment of the present invention is described. FIG. 9 is a plan view showing the structure of an end portion of a wiring substrate used in the liquid crystal display device of this embodiment. Incidentally, FIG. 9 shows the structure of the lower-right corner portion of the sealing member 8 in the wiring substrate. FIG. 10 is a sectional view showing the structure of the liquid crystal display panel taken along the line F-F' of FIG. 9. Incidentally, the basic structure of the wiring substrate of this embodiment is the same as that of the first embodiment, so detailed description thereof is omitted. Further, description about the same components as those of the first embodiment is omitted.

In this embodiment, the interlayer insulating film 11 on the wiring substrate 11 is an organic insulating film. That is, the interlayer insulating film 11 as the organic insulating film is formed above the display signal line 5 and the scanning signal line 3. The pixel electrode 13 is formed on the interlayer insulating film 11. In this embodiment, the pattern of the common signal line 7b is formed concurrently with the formation of the pixel electrode 13. That is, the common signal line 7b and the pixel electrode 13 are formed using the same conductive layer. Accordingly, the common signal line 7 has the two-layer structure: the conductive layer used for the scanning signal line 3 and the conductive layer used for the pixel electrode 13. Thus, a line resistance of the common signal line 7 can be lowered.

In the wiring substrate 1, the surfaces of the scanning signal line 3 and the display signal line 5, and the lead-out lines 4 and 6 are leveled independently of the influence of the base portion pattern due to the effects of the interlayer insulating film 11. That is, the thickness of the organic insulating film is generally much larger than that of inorganic metal thin films forming each line. Accordingly, the influence of the line pattern of the base portion can be suppressed by forming the interlayer insulating film 11 as the organic insulating film. A change in cell gap due to the difference in height between the pattern formation region of the lead-out lines 4 and 6 of the scanning signal line 3 or the display signal line 5 and the formation region of the common signal line 7 is negligible.

Incidentally, the difference in level in the display area 2 on the interlayer insulating film 11 due to the pixel electrode 13 may cause a difference in cell gap around the display area. This is more conspicuous in the liquid crystal display device having the thick pixel electrode 13, for example, a reflection-type liquid crystal display device. That is, in the reflection-type liquid crystal display device, a metal thin film thicker than a transparent conductive film is used for the pixel electrode. In this case, as shown in FIG. 10, the common signal line 7b below the sealing member 8 pattern and the pixel electrode 13 of the display area 2 are formed using the same conductive layer. Thus, the change in panel gap in the region having the display area 2 and the sealing member 8 can be suppressed. Further, the common signal line 7 has the laminate structure, and a resistance can be lowered.

Incidentally, in this embodiment, the common signal line 7 has the two-layer structure: the conductive layer used for the scanning signal line 3 and the conductive layer used for the pixel electrode 13, but the present invention is not limited thereto. For example, the common signal line 7 may have the two-layer structure: the conductive layer used for the pixel electrode 13 and the conductive layer used for the display signal line 5. The common signal line 7 preferably has the two-layer structure: the conductive layer used for a lead-out line adjacent to the common signal line 7 pattern and the conductive layer used for the pixel electrode. Needless to say, the common signal line 7 may have the laminate structure of three or more layers. Further, the pixel electrode 13 and the organic insulating film shown in this embodiment may be uses to the embodiment 2, 3. That is, this embodiment may be applied to the embodiment 2, 3.

Fifth Embodiment

Figure 11:
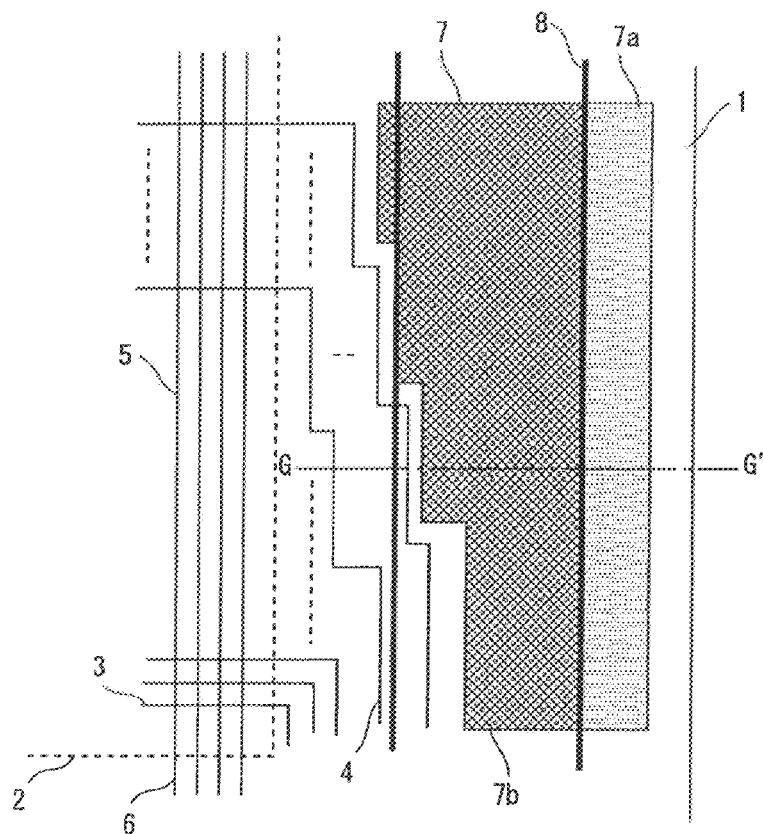
FIG. 11 is a plan view showing the structure of an end portion of the wiring substrate according to the fifth embodiment of the present invention.
Figure 12:
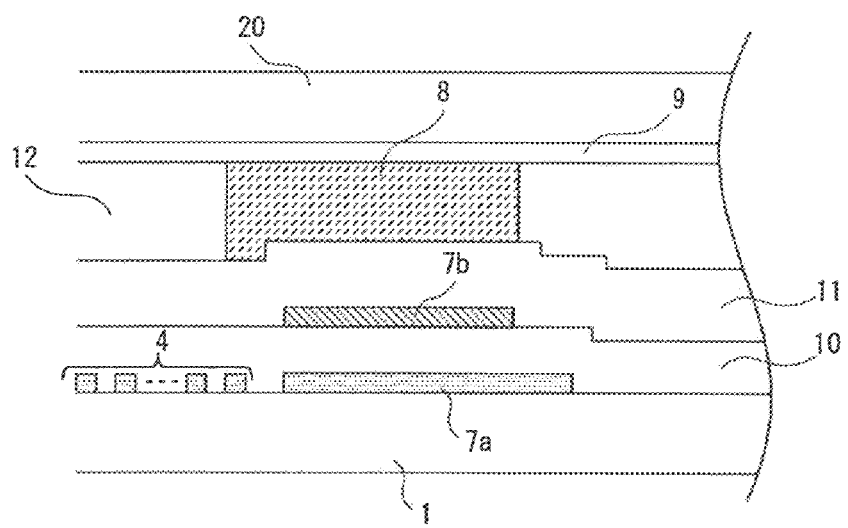
FIG. 12 is a side view showing the structure of a liquid crystal display panel taken along the line G-G' of FIG. 11.
Figure 13:
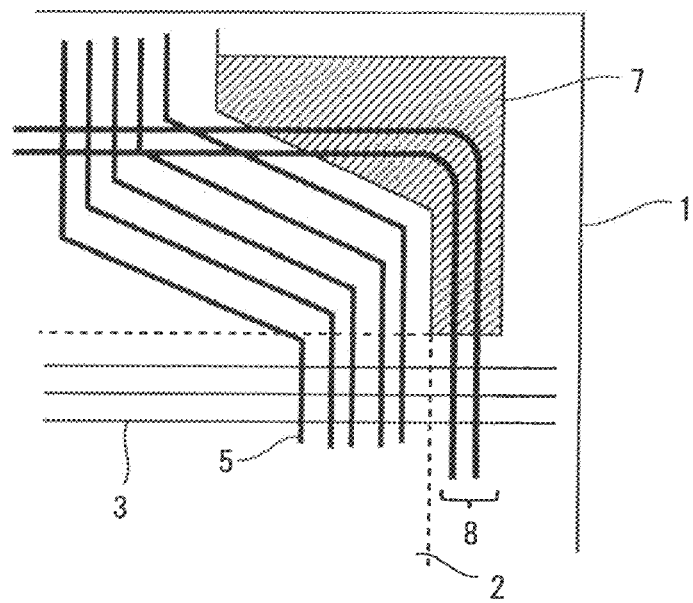
FIG. 13 is a plan view showing a corner portion of a peripheral portion of an image display portion of a TFT array substrate used in a conventional liquid crystal display device.
Figure 14:
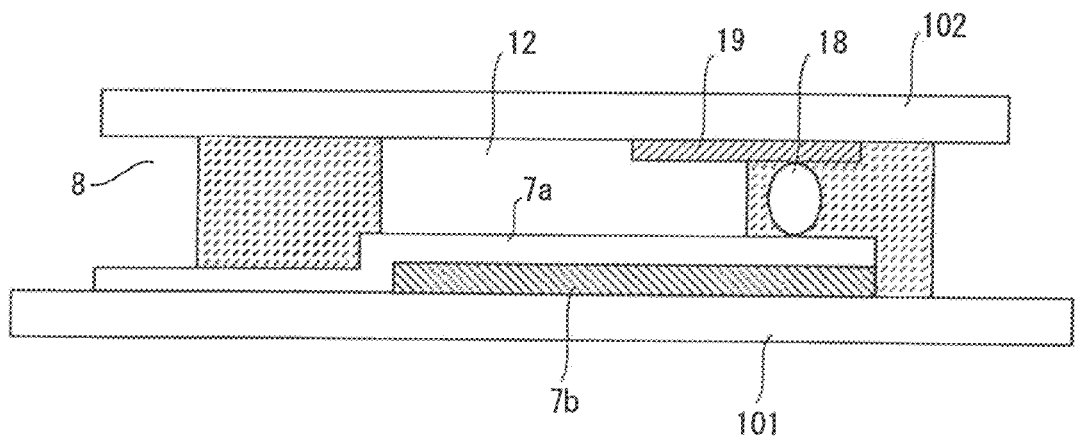
FIG. 14 is a sectional view showing the structure of the conventional liquid crystal display device.

Referring to FIGS. 11 and 12, the structure of a liquid crystal display device according to a fifth embodiment of the present invention is described. FIG. 11 is a plan view showing the structure of an end portion of a wiring substrate used in the liquid crystal display device of this embodiment. Incidentally, FIG. 11 shows the structure of the lower-right corner portion of the display area 2 in the wiring substrate. FIG. 12 is a sectional view showing the structure of the liquid crystal display panel taken along the line G-G' of FIG. 11. The basic structure of the wiring substrate of this embodiment is the same as the first embodiment, so detailed description thereof is omitted. Further, description about the same components as those of the first embodiment is omitted.

In this embodiment, at one side of the sealing member 8 where the common signal line 7 extends, the common signal line 7a as the lower one of the two layers of the common signal line 7 extends to the outside of the outer edge of the sealing member 8 pattern. More specifically, the common signal line 7a and the common signal line 7b are formed with different pattern widths. Then, the common signal line 7a, not the uppermost common signal line 7b, is arranged on the substrate edge outside the pattern outer edge of the sealing member 8. Then, the gate insulating film 10 and the interlayer insulating film 11 are formed on the common signal line 7a. Thus, a portion of the common signal line 7a protruding from the outer edge of the sealing member 8 pattern may be covered with two insulating films. Accordingly, if one insulating film is damaged due to a pin-hole or foreign substance, the other insulating film protects the common signal line 7a, so practically high corrosion resistance is ensured. Further, the line width can be substantially increases, so a resistance of the common signal line 7 can be lowered. Further, the common signal line 7 extending to the outside of the outer edge of the sealing member 8 pattern and two insulating films covering the common signal line shown in this embodiment may be uses to the embodiment 2, 3, 4. That is, this embodiment may be applied to the embodiment 2, 3, 4.

The lines of the first to fifth embodiments are formed using metal thin films such as Al or Cr film. Needless to say, the other materials may be used. For example, the metal thin film is formed through sputtering or vacuum evaporation, and patterned through photolithography, whereby the line patterns can be formed. Further, the pixel electrode 13 and the counter electrode 9 are made up of a transparent conductive film such as an ITO film. For example, the transparent conductive film is formed through sputtering or vacuum evaporation, and patterned through photolithography, whereby the pixel electrode 13 and the counter electrode 9 can be formed. Incidentally, if the counter electrode 9 is formed on the entire surface of the opposing substrate, patterning through the photolithography is unnecessary. Further, in the case of the reflection type liquid crystal display device, the pixel electrode is made up of a metal thin film. The same conductive layers as the wiring layers are laminated to form the common signal line 7, whereby the common signal line 7 can be patterned into a desired shape without increasing the number of manufacturing processes.

The first to fifth embodiments describe the common signal line 7 formed of the two conductive layers, but the present invention is not limited thereto. For example, the common signal line 7 may be made up of three or more conductive layers. That is, the common signal line 7 needs only to have at least two conductive layers. Further, the common signal line 7 is preferably made up of at least two conductive layers of conductive layers used for the scanning signal line 3, conductive layers used for the display signal line 5, or conductive layers used for the pixel electrode 13.

It is apparent that the present invention is not limited to the above embodiment that may be modified and changed without departing from the scope and spirit of the invention.

What is claimed is:

1. A liquid crystal display device, comprising: a wiring substrate; an opposing substrate opposite to the wiring substrate; a sealing member for bonding the wiring substrate to the opposing substrate; a liquid crystal filled in a space defined by the wiring substrate, the opposing substrate, and the sealing member, a plurality of scanning signal lines formed in a display area formed inside the sealing member; a plurality of display signal lines formed in the display area and crossing the scanning signal lines through an insulating film; and a common signal line formed outside the display area and extending along one end of the sealing member below the pattern of the sealing member; the scanning signal lines, the display signal lines, and common signal line being formed on the wiring substrate, and the common signal line including at least two conductive layers, the conductive layer that is not an uppermost conductive layer among the conductive layers of the common signal line extending up to the outside of an outer edge of the pattern of the sealing member at one end of the sealing member in which the common signal line extends, the uppermost conductive layer does not extend to the outside of an outer edge of the pattern of the sealing member at one end of the sealing member in which the common signal line extends, and the conductive layers extending up to the outside of the outer edge of the pattern of the sealing member being covered with two or more insulating films.

2. The liquid crystal display device according to claim 1, wherein the common signal line includes a conductive layer for forming the display signal line and a conductive layer for forming the scanning signal line.

3. The liquid crystal display device according to claim 1, wherein a pixel electrode connected with the display signal line through a switching element, and an organic insulating film provided below the pixel electrode are formed on the wiring substrate, the organic insulating film provided above the display signal line and the scanning signal line, and the common signal line includes a conductive layer for forming the pixel electrode.

\* \* \* \* \*